2,841,522

FUNGICIDAL CHLORONITROBENZOIC ACID ESTER COMPOSITION AND METHOD OF USING SAME

Calvin N. Wolf, New York, N. Y., assignor, by mesne assignments, to Pittsburgh Coke and Chemical Company, a corporation of Pennsylvania No Drawing. Application May 20, 1954
Serial No. 431,258

6 Claims. (Cl. 167—30)

This invention relates to fungicidal compositions and their use and in particular to formulation and use of esters of chloronitrobenzoic acids. Discovery has now been made that esters of chloronitrobenzoic acids are outstanding fungicides, particularly in use to protect foliage from the ravages of fungi and to protect industrial commodities, such as paint, leather, textile, plastics, paper, fibers, and the like, from mildew and other fungus attack.

The esters which are useful in this invention are esters of chloronitrobenzoic acids. They can be represented by the formula

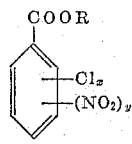

where $x$ and $y$ are integers, each of which can vary from 1 to 4 but wherein the sum of $x$ and $y$ does not exceed 5 and R is any organic group. R is preferably hydrocarbonaceous or halohydrocarbonaceous. When R is hydrocarbonaceous, it can be aliphatic or aromatic; that is, alkyl, alkenyl, cycloalkyl, aryl, or aralkyl. Likewise when R is a halohydrocarbon group, it can be aromatic or aliphatic; that is, R can be haloalkyl, haloalkenyl, halocycloalkyl, haloaryl, or haloaralkyl. When R is halohydrocarbonaceous, the halogen is preferably chlorine. R, however, in addition to the above named types of groups, can be other organic groups, such as hydrocarbon groups substituted with hydroxyl, amino, sulfonic acid, and other groups. Many of these groups contribute materially to the ancillary properties which are so important in the commercial success of a fungicide.

The esters of the present invention as well as being superior in fungicidal effectiveness to the parent chloronitrobenzoic acids are also extremely beneficial in that wide variation can be made in the nature of the esterifying group to permit broad variation in the properties, physical, chemical, and biological, of the various active ingredients. In other words, by esterifying the chloronitrobenzoic acids a considerable degree of "internal formulation" is realized. Although the preferred esterifying groups contain from 1 to 12 carbon atoms, many of the groups having more than 12 carbon atoms are of great utility in this invention.

Typical esters of this invention include the methyl, ethyl, propyl, butyl, isobutyl, and the isomeric amyl, hexyl, heptyl, octyl, nonyl, decyl, undecyl, and dodecyl esters of the above and other chloronitrobenzoic acids as well as the corresponding esters in which one or more of the hydrogens in the alkyl group is replaced with halogen, as in the α-chloromethyl, α-chloroethyl, β-chloroethyl, β-bromoethyl, γ-iodohexyl, α-chlorododecyl, and the like radicals. The esterifying radical can also be alkenyl, as in the case of vinyl, allyl, and propenyl esters of chloronitrobenzoic acids, or it can be cycloalkyl, such as cyclopentyl, cyclohexyl, and the like. In the aromatic series it can be phenyl, p-chlorophenyl, o-chlorophenyl, m-chlorophenyl, naphthyl, p-tolyl, p-biphenyl, benzyl, and the like.

The esters of the present invention can be esters of monochloromononitrobenzoic acids, dichloromononitrobenzoic acids, trichloromononitrobenzoic acids, tetrachloromononitrobenzoic acids, monochlorodinitrobenzoic acids, trinitromonochlorobenzoic acids, tetranitromonochlorobenzoic acids, dinitrotrichlorobenzoic acids, trichlorodinitrobenzoic acids, and trinitrodichlorobenzoic acids. Typical such esters are methyl 2-chloro-3-nitrobenzoate, ethyl 2-chloro-5-nitrobenzoate, p-chlorophenyl 3-chloro-4-nitrobenzoate, benzyl 3-chloro-6-nitrobenzoate, α-chloropropyl 2-nitro-4-chlorobenzoate, dodecyl 2,3-dichloro-6-nitrobenzoate, methyl 2,4-dichloro-5-nitrobenzoate, α-naphthyl 2,5-dichloro-3-nitrobenzoate, allyl 3,4-dichloro-2-nitrobenzoate, hexyl 3,5-dichloro-4-nitrobenzoate, m-tolyl 2,3,4-trichloro-5-nitrobenzoate, n-amyl 2,3,5-trichloro-4-nitrobenzoate, isobutyl 2,3,6-trichloro-5-nitrobenzoate, β-bromoethyl 2,3,4,5-tetrachloro-6-nitrobenzoate, 2,4-dinitrophenyl 2,3,5,6-tetrachloro-4-nitrobenzoate, nonyl 2,3,4,6-tetrachloro-5-nitrobenzoate, methyl 2,3-dinitro-4-chlorobenzoate, o-chlorophenyl 2,5-dinitro-4-chlorobenzoate, phenyl 2,6-dinitro-3-chlorobenzoate, octyl 3,4-dinitro-5-chlorobenzoate, methyl 3,5-dinitro-2-chlorobenzoate, ethyl 3,5-dinitro-4-chlorobenzoate, β-hydroxyethyl 2,3,4-trinitro-5-chlorobenzoate, p-tolyl 2,3,4-trinitro-6-chlorobenzoate, isopropyl 2,3,5-trinitro-4-chlorobenzoate, α-bromomethyl 2,3,4,5-tetranitro-6-chlorobenzoate, decyl 2,3,5,6-tetranitro-4-chlorobenzoate, p-ethylphenyl 2,3-dichloro-5,6-dinitrobenzoate, phenyl 2,6-dichloro-3,5-dinitrobenzoate, methyl 2,3,4-trichloro-5,6-dinitrobenzoate, β,α-dichloropropyl 2,3,5-trichloro-4,6-dinitrobenzoate, ethyl 2,3,4-trinitro-5,6-dichlorobenzoate, butyl 2,3,5-trinitro-4,6-dichlorobenzoate, and the like. The 3,5-dinitro-4-chlorobenzoates exhibit highest fungicidal activity and for this reason are preferred.

Thus, it is seen that the present invention comprises providing fungicidal compositions comprising a conditioning agent and an ester of a chloronitrobenzoic acid; particularly a composition comprising a conditioning agent and an ester of 3,5-dinitro-4-chlorobenzoic acid. The present invention also includes a method for combating fungi comprising applying an ester of a chloronitrobenzoic acid, particularly an ester of 3,5-dinitro-4-chlorobenzoic acid, to the loci of fungi. By the loci of fungi is meant either a material infested by fungi or material subject to such infestation. This includes both crops and industrial commodities of the type illustrated above.

Many other esters will be apparent to those skilled in the art. The esters of the present invention can be conveniently prepared by reaction of the corresponding benzoyl chloride with the appropriate alcohol, as illustrated in the following examples.

Example I

In a reaction vessel equipped with a reflux condenser was placed 24 parts of 3,5-dinitro-4-chlorobenzoic acid and 20 parts of phosphorus pentachloride. This mixture was heated at 100° C. for 2 hours, at the end of which time the mixture was distilled under reduced pressure to remove phosphorus oxychloride. To the 3,5-dinitro-4-chlorobenzoyl chloride prepared in this fashion was added 157 parts of anhydrous isopropanol, and this mixture was refluxed with stirring for 2 hours. At the end of this time the reaction mixture was cooled to room temperature, whereupon isoproyl 3,5-dinitro-4-chlorobenzoate precipitated. This product was separated from its mother liquor by filtration and was recrystallized from a benzene-hexane mixture yielding 13 parts (45 percent) of a white solid melting at 112–114° C.

By a similar procedure the following esters were prepared in good yield: methyl 3,5-dinitro-4-chlorobenzoate, ethyl 3,5-dinitro-4-chlorobenzoate, β-chloroethyl 3,5-dinitro-4-chlorobenzoate, n-propyl 3,5-dinitro-4-chlorobenzoate, allyl 3,5-dinitro-4-chlorobenzoate, and β-chloroethyl 4-chloro-3-nitrobenzoate.

For maximum effectiveness the compounds of the present invention are admixed in fungicidally effective amount with a conditioning agent of the type commonly referred to as a pest control adjuvant or modifier. In order to provide formulations particularly adapted for ready and efficient application to pests using conventional equipment, such formulations comprise those of both the liquid and solid types. In the pure state my compounds may be too effective or too potent in some applications to have practical utility as fungicides. For example, in order to protect most effectively a surface such as paint, wood, concrete, etc., it is preferred to apply my compounds in intimate contact but thoroughly dispersed on the surface. Likewise, in treating more or less porous material, such as cloth, felted textiles, and woven fibers, it is important that my compounds be interspersed between the fine structure of such materials and be in intimate contact therewith. Therefore, in order to benefit from my discovery that the defined compounds are effective fungicides, I incorporate therewith a relatively inert surface-active agent or adjuvant as a dispersing medium. Furthermore, such adjuvants have the effect of requiring only minute quantities of the above defined compounds in some formulations to obtain effective protection. A further advantage of so extending these compounds is to permit field application by methods readily employed and still obtain effectively complete coverage of the material being protected.

Further examples of conditioning agents which suitably enhance the fungicidal properties of the present invention include various industrial commodities such as paints, plastics, and the like. Such materials serve as conditioning agents by means of diluting the active ingredient and thus extending its fungitoxic powers over a wide area to be protected while still using an economically small amount of the active ingredient. Such conditioning agents also enhance the usefulness of the active ingredients by reducing their surface tension, thus making them wet the loci of the fungi more readily.

The formulations of this invention, therefore, comprise the hereinabove defined fungicidally active ingredient and a suitable material as an adjuvant or conditioning agent therefor. It is not intended that this invention be limited to any specific proportions of active ingredient and adjuvant. The important feature of the invention is to provide a conditioning agent such that upon the preparation of a formulation of such concentration as appropriate for application, the conditioning agent will be present to provide the proper type of contact with the material being protected. Thus, in one embodiment the conditioning agent can comprise a surface-active agent such as a detergent, a soap, or other wetting agent. Such a formulation then comprises the active ingredient in combination with a minor proportion of the surface-active agent. Such a formulation is of practical merit because of its concentrated form and ease of transportation, storage, and the like. Such a formulation lends itself directly to further dilution with the carrier without resorting to complicated mixing and blending procedures. Thus, such a formulation can be directly suspended in water or can be further diluted with an oil which upon mixing with water thereby forms an oil-in-water emulsion containing the active ingredient. One further example of the utility of such a formulation comprises the preparation by further dilution with a solid carrier of a wettable powder which upon admixture with water prior to application forms a dispersion of the active ingredient and the solid carrier in water.

It is also intended that the term "conditioning agent" include solid carriers of the type of talc, pyrophyllite, Attaclay, kieselguhr, chalk, diatomaceous earth, and the like; and various mineral powders, such as calcium carbonate and the like, which act as a dispersant, as a carrier, and in some instances perform the function of a surface-active agent.

One method of applying these fungicides is in the form of a water suspension. To obtain a fungicidally active aqueous suspension, I preferably employ a surface-active agent in sufficient amount to disperse and suspend the fungicidal agent. Examples of such surface-active agents which can be employed in forming dispersions include salts of the alkyl and alkylaryl sulfonates, such as the sodium salt of sulfonated ethyloleate, the sodium salt of sulfonated oxidized petroleum oils, dioctyl sodium sulfosuccinate, sodium decylbenzene sulfonate, potassium dodecylbenzene sulfonate, and the sodium salt of sulfonated ethyloleyl amide; alkyl salts, such as sodium lauryl sulfate, sodium oleyl sulfate, ammonium ricinoleyl sulfate, and the like; alkylaryl polyether alcohols, such as alkyl, phenoxy, polyethoxyethanol (alkyl can be methyl to $C_{20}$), the condensate of ethylene oxide and alkylated cresol, polyoxy ethylene thioether, and the like; fatty acid esters of polyhydric alcohols, such as mannitan monolaurate, sorbitan monooleate, and the like; and the ethylene oxide addition products of such esters, such as the polyoxy ethylene derivative of sorbitan monooleate, etc. Still other surface-active agents can be employed, the above merely showing a representative list of the more common materials.

In the examples which follow, all parts are parts by weight.

Example II

A formulation of isopropyl 3,5-dinitro-4-chlorobenzoate is prepared by adding with vigorous agitation 10 parts of this material to 1000 parts of water containing one part of Tween-80. This concentrated dispersion is further diluted 1000 times by the addition of water to obtain a formulation of suitable concentration for application. Thus, the resulting dispersion contains 10 p. p. m. of my fungicide in the water dispersion.

The solubility of the active ingredient of this invention is organic solvents, furthermore, is such that it can be applied advantageously in the form of solution in this type of solvent, and for certain uses this method of application is preferred. For example, in treating cloth, leather, or other fibrous articles, it is sometimes preferred to apply the fungicide dissolved in a volatile solvent. After use the volatile solvent evaporates, leaving the fungicidal agent impregnated throughout the surface of the article and in the dispersed form which has been found to be most advantageous. Likewise, in applying the fungicide to smooth surfaces, as, for example, in treating wood or other surfaces, a solution may be the most practical method for applying a protective film by brushing, spraying, or dipping. The choice of an appropriate solvent is determined largely by the concentration of active ingredient which it is desired to employ, by the volatility required in a solvent, the spreading or flow characteristics thereof, and by the nature of the material being treated. Among the many organic solvents which can be employed as the carrier for the fungicide, I use hydrocarbons, such as benzene, xylene, or toluene; ketones, such as acetone, methylethyl ketone, and cyclohexanone; chlorinated solvents, such as carbon tetrachloride, trichloro- and perchloroethylene; esters, such as ethyl, butyl, and amyl acetates; and alcohols, such as ethanol, isopropanol, and amyl alcohols. Other solvents which are employed are the carbitols and cellosolves, the former comprising in general the monoalkyl ethers of diethylene glycol, and the latter, the monoalkyl ethers of ethylene glycol. In addition, combinations of these various typical solvents can be employed whereby special volatility and viscosity characteristics can be imparted to the formulations.

Example III

A solution consisting of 5 parts of phenyl 2,3,4,5-tetrachloro-6-nitrobenzoate in 250 parts of cyclohexanone is prepared by stirring the two constituents for a period of 2 minutes at a temperature of about 25° C. This concentrated solution, suitable for storage or transportation, is further diluted with kerosene to form a final dilution of 50 p. p. m. suitable for application.

A preferred formulation of the active ingredient fungicide of this invention comprises a wettable powder. In preparing wettable powders several formulation procedures are possible. Thus, it is one intention of this invention to provide compositions comprising the active ingredient defined herein in combination with a minor amount of a surface-active agent. Such surface-active agent can be chosen, for example, from among those mentioned above in connection with aqueous dispersions. Still other surface-active agents can be employed, the above merely showing a representative list of the more common materials. Such formulations can be readily admixed with a dust carrier. Formulations thus formed then comprise the active ingredient of this invention, a surface-active agent, and the inert carrier. Among the inert carriers which can be employed in thus preparing wettable powders are, for example, soybean flour, tobacco flour, walnut shell flour, wood flour, sulfur, tripolite, diatomite, calcium lime, magnesium lime, calcite, dalomite, gypsum, mica, talc, pyrophyllite, montmorillonite, kaolinite, attapulgite, apatite, and pumice. In preparing such concentrated wettable powders it is preferred to employ between about 0.1 and 5 percent of the surface-active agent based upon the amount of active ingredient, and up to 85 percent of the inert carrier based upon the total amount of the formulations. Such formulations provide the advantage of permitting storage and transportation of the fungicide and permit further dilution by simple admixture with water at the time of application. Thus, within the scope of this invention is also contemplated finished formulations for direct application comprising the fungicides as defined herein, surface-active agents as illustrated above, and inert solid carriers as likewise illustrated above, all suspended in water. Such finished formulations, depending upon the application in mind, can include between about 0.1 to 10,000 p. p. m. of active ingredient. A preferred range for agricultural application is between 0.1 and 2,000 p. p. m. Typical formulations of such wettable powders of this invention are illustrated in the following examples, wherein the active ingredient of this invention is employed as the fungicide.

Example IV

A mixture of 100 parts of allyl 2-chloro-6-nitrobenzoate, 1000 parts of Attaclay, and 0.1 part of Nacconol is intimately co-mingled in an L-shaped blender. The 10 percent wettable powder thus prepared produces a satisfactory water suspension when 11 parts are stirred into sufficient water to produce a suspension containing 100 p. p. m. active ingredient.

In addition to the above described methods of wet application of the active ingredient of this invention, compositions can be prepared in which the material is extended in talc, clay, or other solid diluents. Such carriers perform the conditioning agent function as contact agents. Further specific examples of such typical inert solid carriers which can be employed as diluents in the dust formulations include fuller's earth, pyrophyllite, Attaclay, and the Filtrols.

Example V

A dust formulation of the fungicide is prepared as follows: One part of γ-chloropropyl 2,6-dinitro-3-chlorobenzoate is placed in a ball mill with 100 parts of fuller's earth. This mixture is milled for a period of one hour and screened to collect a fraction passing a 100-mesh sieve. This one percent by weight formulation can be applied directly or further diluted. A further dilution is made by repeating the above procedure with an additional 100 parts of fuller's earth per part of the first-obtained mixture.

For certain applications it is preferred to employ the fungicide in the form of oil-in-water emulsions. Thus, a concentrate of the fungicidal agent is prepared in a water-insoluble solvent, and this solution is then dispersed or emulsified in water containing a surface-active agent. Typical examples of such solvents include hydrocarbons, such as kerosene, benzene, or naphtha; higher alcohols, such as butanol, oleyl alcohol, or ethers and esters thereof; and chlorinated solvents, such as perchloroethylene and trichloroethylene.

Example VI

An oil-in-water emulsion is prepared by dissolving 10 parts of p-tolyl 2,3,4-trinitro-6-chlorobenzoate in 1000 parts of kerosene. This solution is dispersed with vigorous agitation in water containing 1 part of Triton X-100 to provide a dispersion containing 10 p. p. m. of active agent.

In addition, I have found that I can incorporate an adherent or sticking agent, such as vegetable oils, naturally occurring gums, and other adhesives, in my active ingredient formulations. Likewise, I can employ humectants in my formulations. Furthermore, these formulations can be employed in admixture with other fungicidal materials or other biocides, such as insecticides, larvicides, bactericides, vermicides, miticides, or with other materials which it is desired to apply along with my fungicides, including mixtures of my active ingredients.

The fungicidal effectiveness of my compounds can be illustrated by their action against the fungi *Alternaria oleracea* and *Sclerotinia fructicola* as well as early and late blight against tomatoes. To test against the two former fungi, a suspension of 100 parts of the active ingredient in 1000 parts of distilled water containing a small amount of a commercial dispersant is prepared. This suspension is tested against the fungi and further diluted with water until the concentration of the active ingredient which prevents one-half of the fungi from sporulating is determined.

The effectiveness of my fungicides in protecting growing plants from fungus diseases has been demonstrated by control of the tomato early blight. This test involves spraying the test plants with a 0.2 percent concentration of the fungicide, innoculation with spores of *Alternaria solani*, and determination of the number of disease lesions which develop. Bonny Best tomato plants grown in three-inch pots to a height of 4–7 inches were used as host plants. Three replicate plants were used for each compound. The 0.2 percent spray suspension of the compounds was made up in 0.01 percent Tween-20 solutions in all cases. The tomato plants were sprayed on a revolving turntable with the fungicide suspension by means of a DeVilbiss paint spray gun. Each turntable load of plants was sprayed with 85 cc. of spray suspension. No appreciable loss of fungicide from the plants because of run-off occurs under these conditions. Under the standard conditions used, a deposit of approximately 0.0015 g. of fungicide per 100 cm.$^2$ of total leaf area (i. e. including upper and lower leaf surfaces) is obtained. After the fungicide deposit was allowed to dry, the plants were inoculated with a spore suspension of the test fungus, *Alternaria solani*. The spores were obtained from fungus cultures grown on salt-potato-dextrose-agar at 20° C. for 7–14 days. Twenty milliliters of a suspension containing 50,000 spores per ml. was used to innoculate each turntable load of plants. The spores were sprayed under an air pressure of 10 p. s. i. by means of a DeVilbiss atomizer held about one foot from the plants. Both the upper and lower leaf surfaces were uniformly inoculated by this method. Following inoculation, the plants were placed in an infection chamber which was maintained at 20° C. and 100 percent relative humidity. After 40-48 hours in this chamber, the plants were removed to a greenhouse bench. Lesions usually developed 3 to 4 days after inoculation. The total number of early blight lesions on three compound leaves of each sprayed plant was determined. Leaves having the same position on the plant were counted for all treatments and the controls. In such tests my ingredient was found to achieve 95 percent control of the disease at a concentration of only 80 p. p. m. In similar tests conducted against the late blight disease on tomato plants, 95 percent control was obtained at a concentration of only 50 p. p. m. Coupled with this my fungicide is found to be non-phytotoxic to tomato plants at concentrations at least as high as 3200 p. p. m. It has also been found to be non-phytotoxic against the bean at 3200 p. p. m. concentration, and against the apple at 12,800 p. p. m.

In such tests the following results were observed.

| Compound | Conc. in p. p. m. nec. for contr. | | | |
|---|---|---|---|---|
| | A. o. | S. f. | Early blight | Late blight |
| Methyl 3,5-dinitro-4-chlorobenzoate | 0.5 | 50 | 0.5 | 0.5 |
| Ethyl 3,5-dinitro-4-chlorobenzoate | 0.5 | 50 | 50 | 50 |
| β-Chloroethyl 3,5-dinitro-4-chlorobenzoate | 0.5 | 0.5 | 50 | 0.5 |
| n-Propyl 3,5-dinitro-4-chlorobenzoate | 0.5 | 50 | 50 | 0.5 |
| Isopropyl 3,5-dinitro-4-chlorobenzoate | 0.5 | 50 | 0.5 | 0.5 |
| Allyl 3,5-dinitro-4-chlorobenzoate | 0.5 | 0.5 | 50 | 50 |
| β-Chloroethyl 4-chloro-3-nitrobenzoate | 50 | 500 | >2,000 | >2,000 |
| 3,5-Dinitro-4-chlorobenzoic acid | 500 | 1,500 | >2,000 | >2,000 |

Thus, the compounds of this invention are markedly superior to the free chloronitrobenzoic acids in fungicidal action.

This advantage can be demonstrated also with regard to their pea seed protectant qualities. In this test mixtures of pea seeds and the active incredients are intimately co-mingled by placing mixtures containing varying amounts of the active ingredient and the seeds in a jar which is then rotated mechanically for 30 minutes at 200 R. P. M. The impregnated seeds are then planted in composted soil severely infested with seed-decay and damping-off fungi (Pythium *spp.* and Rhizoctonia *spp.*). Lots of 25 seeds per row, 8 rows per flat, are sown at random at each of 4 replications. The seeds are covered with the infested soil to a uniform depth and are uniformly watered. Untreated checks and a standard material are included in each test in addition to a check planted in sterilized soil. The flats are stacked until the seeds begin to emerge, and the flats are then removed to the greenhouse. Emergence records are taken at 14 days and are converted to percentage emergence. With 3,5-dinitro-4-chlorobenzoic acid only 10 percent of the seeds emerged from the ground after treatment with a 0.48 percent concentration, whereas with the active ingredients of this invention the percent emergence ranged up to 80. Even at concentrations of 0.12 percent active ingredient ethyl-3,5-dinitro-4-chlorobenzoate, for example, gave a pea seed emergence of 48 percent. The other esters of this invention give similar results against the above and other fungi.

I claim:

1. Fungicidal composition comprising a fungicidally inert surface-active dispersing agent and an ester of a chloronitrobenzoic acid.

2. Fungicidal composition comprising a fungicidally inert surface-active dispersing agent and an ester of 3,5-dinitro-4-chlorobenzoic acid.

3. Fungicidal composition comprising a fungicidally inert surface-active dispersing agent and methyl-3,5-dinitro-4-chlorobenzoate.

4. Method of combating fungi comprising treating the loci of the fungi with a composition containing 0.1 to 10,000 p. p. m. of an ester of chloronitrobenzoic acid.

5. Method of combating fungi comprising treating the loci of the fungi with a composition containing 0.1 to 10,000 p. p. m. of an ester of 3,5-dinitro-4-chlorobenzoic acid.

6. Method of combating fungi comprising treating the loci of the fungi with a composition containing 0.1 to 10,000 p. p. m. of methyl-3,5-dinitro-4-chlorobenzoate.

References Cited in the file of this patent

UNITED STATES PATENTS

| 1,953,629 | Pfaff et al. | Apr. 3, 1934 |
| 2,516,313 | Goddin et al. | July 25, 1950 |
| 2,519,317 | Kolka et al. | Aug. 15, 1950 |
| 2,588,428 | Stewart et al. | Mar. 11, 1952 |

OTHER REFERENCES

King: "Chemicals Evaluated as Insecticides and Repellents at Orlando, Fla.," Agr. Handbook No. 69, U. S. D. A., May 1954, pp. 6 and 74 pert.

Chem. Absts., 40:5412$^9$.

Brown: Insect Control by Chemicals, 1951, John Wiley and Sons, Inc., p. 113.